United States Patent
Narayan et al.

(10) Patent No.: US 7,177,950 B2
(45) Date of Patent: Feb. 13, 2007

(54) SYNCHRONIZATION AND RECOVERY OF PEERS IN A PEER TO PEER ENVIRONMENT

(75) Inventors: Michael J. Narayan, Seattle, WA (US); Aaron W. Ogus, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 700 days.

(21) Appl. No.: 09/843,452

(22) Filed: Apr. 26, 2001

(65) Prior Publication Data

US 2002/0161821 A1  Oct. 31, 2002

(51) Int. Cl.
G06F 15/16 (2006.01)

(52) U.S. Cl. .................. 709/248; 709/201; 709/204; 709/223

(58) Field of Classification Search ............... 709/201, 709/204, 205, 230
See application file for complete search history.

(56) References Cited

U.S. PATENT DOCUMENTS

| 5,695,400 | A | * | 12/1997 | Fennell et al. | 463/42 |
| 5,793,962 | A | * | 8/1998 | Badovinatz et al. | 709/201 |
| 5,822,523 | A | * | 10/1998 | Rothschild et al. | 709/236 |
| 5,987,376 | A | * | 11/1999 | Olson et al. | 701/201 |
| 6,018,766 | A | * | 1/2000 | Samuel et al. | 709/218 |
| 6,065,062 | A | * | 5/2000 | Periasamy et al. | 709/242 |
| 6,226,686 | B1 | * | 5/2001 | Rothschild et al. | 709/245 |
| 6,226,687 | B1 | * | 5/2001 | Harriman et al. | 709/246 |
| 6,275,831 | B1 | * | 8/2001 | Bodnar et al. | 707/201 |
| 6,311,209 | B1 | * | 10/2001 | Olson et al. | 709/204 |
| 6,415,317 | B1 | * | 7/2002 | Yelon et al. | 709/205 |
| RE38,134 | E | * | 6/2003 | Ross et al. | 710/20 |
| 6,732,144 | B1 | * | 5/2004 | Kizu et al. | 709/203 |
| 6,839,752 | B1 | * | 1/2005 | Miller et al. | 709/224 |
| 6,845,389 | B1 | * | 1/2005 | Sen et al. | 709/204 |
| 2002/0073153 | A1 | * | 6/2002 | Miller | 709/205 |
| 2002/0152271 | A1 | * | 10/2002 | Chafle et al. | 709/204 |
| 2002/0156875 | A1 | * | 10/2002 | Pabla | 709/220 |

* cited by examiner

Primary Examiner—Bunjob Jaroenchonwanit
Assistant Examiner—Dohm Chankong
(74) Attorney, Agent, or Firm—Shook, Hardy & Bacon LLP

(57) ABSTRACT

A method is provided for use in a computer system that is operating in a peer-to-peer environment. The peer-to-peer environment has a host peer and at least one non-host peer. The method of the invention is used to order the operation requests of the peers so that operations are performed only in the order that they are processed by the host peer. The method includes providing a list of recognized operations which may be requested by any of the peers in the session. The host peer then receives at least one operation request from one of the peers, the request being selected from the provided list. The host then assigns a unique version number to the operation request, so that all peers within the session can determine the proper order in which to process orders given by the host peer.

18 Claims, 6 Drawing Sheets

SYNCHRONIZATION AND RECOVERY OF PEERS IN A PEER TO PEER ENVIRONMENT

CROSS-REFERENCE TO RELATED APPLICATION

None.

TECHNICAL FIELD

The present invention relates to a computer system and, more particularly, to a computer system and method in a peer-to-peer environment that synchronizes and recovers peer information as peers join and leave a peer-to-peer session.

BACKGROUND OF THE INVENTION

Two of the basic types of computer networking environments are a client-server environment and a peer-to-peer environment. Both types of environments may be used by computer users in the playing of a computer game. Each type of environment offers certain advantages over the other.

As shown in FIG. 2, a client-server environment involves the connection of one or more client computers to a server via some type of network. In this environment, a client may wish to connect to the server to begin a gaming session or other activity. The server is at a known location that typically will not change over time. When the client connects to the server, the server will perform some type of validation or authentication to ensure that the client is requesting access to an appropriate game or activity and that the client has the necessary software or hardware to access the game or activity. In the client-server environment, the server also determines if the game or activity has room for the additional client. In the client-server environment, the clients connected to the server will not have full knowledge of the presence and activities of other clients connected to the server. Therefore, in this environment, it is not necessary for the clients to have synchronized information regarding other clients.

The client-server environment is not always desirable to computer users. For example, in the client-server environment, the various clients are not always able to play a game against one another. In contrast, a peer-to-peer environment allows clients, or peers, to play a game or engage is some other activity where each peer has full knowledge of the presence and activities of all other peers connected in the session. Another drawback existing with the client-server environment centers on the need for the server to exist within the session. Any server downtime therefore serves as a single point of failure that could terminate an entire session. The session would be unavailable until the server was back, up and running properly. A peer-to-peer session is illustrated schematically in FIG. 3 and is discussed in more detail below. While such an environment does present advantages, it has heretofore presented certain drawbacks as well. For example, in the client-server environment, the server is almost always at the same location or address, and the particular clients connected to the server do not need to synchronize information. Moreover, the server is unlikely to stop operation, so the gaming session may continue without interruption. In contrast, in the peer-to-peer environment, the first peer to initiate a session is called the "host." The "host" will typically change from session to session and may change during a session if the "host" stops operating within the session. Peers may join and drop from sessions as the session continues, including the host dropping. In a peer-to-peer session, however, it is critical for each peer connected and participating within the session to have the same information regarding all of the other peers in the session. The host peer will typically coordinate the synchronization of this information. Therefore, when a host drops from the session, a new host must take over the responsibilities or the integrity of the game will be lost. This process is commonly called "host migration."

In prior art peer-to-peer environments, the process of synchronization of peer information and host migration has suffered from reliability problems. Many of these problems stem from the fact that in a networked environment, the order of messages and information sent between connected peers cannot be reliably determined. Thus, in these prior art peer-to peer environments, attempts to maintain the integrity of the session have had only limited success, resulting in sessions being lost prematurely, or sessions fragmenting into two or more parts.

Accordingly, there is a need for an effective system and method for a peer-to-peer session that ensures all peers have a consistent view of all other peers. A system and method for a peer-to-peer session that ensures all peers are synchronized after a host peer has left the session is also needed.

SUMMARY OF THE INVENTION

Accordingly, the present invention provides for a method for use in a computer system that is operating in a peer-to-peer environment. The peer-to-peer environment has a host peer and at least one non-host peer. The method of the invention is used to order the operation requests of the peers so that operations are performed only in the order that they are processed by the host peer. The method includes providing a list of recognized operations which may be requested by any of the peers in the session. The host peer then receives at least one operation request from one of the peers, the request being selected from the provided list. The host then assigns a unique version number to the operation request, so that all peers within the session can determine the proper order in which to process orders given by the host peer.

The present invention further includes a method for use in a computer system that is operating in a peer-to-peer environment that has a current host peer and at least one non-host peer. The method being used to select a new host peer when the current host peer terminates participation in the peer-to-peer environment. The method includes providing each peer with an assigned version number indicative of the order in which the peer first joined the peer-to-peer environment. The method further includes determining whether the current host peer has terminated participation in the peer-to-peer environment. If the current host peer has terminated participation, each remaining peer determines if they have the lowest version number, indicating that they joined the peer-to-peer environment prior to any remaining peers. If the peer has the lowest version number, the peer sends, to each remaining peer, a message indicating that it is the new host peer.

Additional advantages and novel features will be set forth in the description which follows and in part may become apparent to those skilled in the art upon examination of the following or may be learned by practice of the invention.

BRIEF DESCRIPTION OF THE SEVERAL VIEWS OF THE DRAWING

The present invention is described in detail below with reference to the attached drawing figures, wherein:

FIG. 6b is a continuation of the flow chart of FIG. 6a.

DETAILED DESCRIPTION OF THE INVENTION

Figure 1:
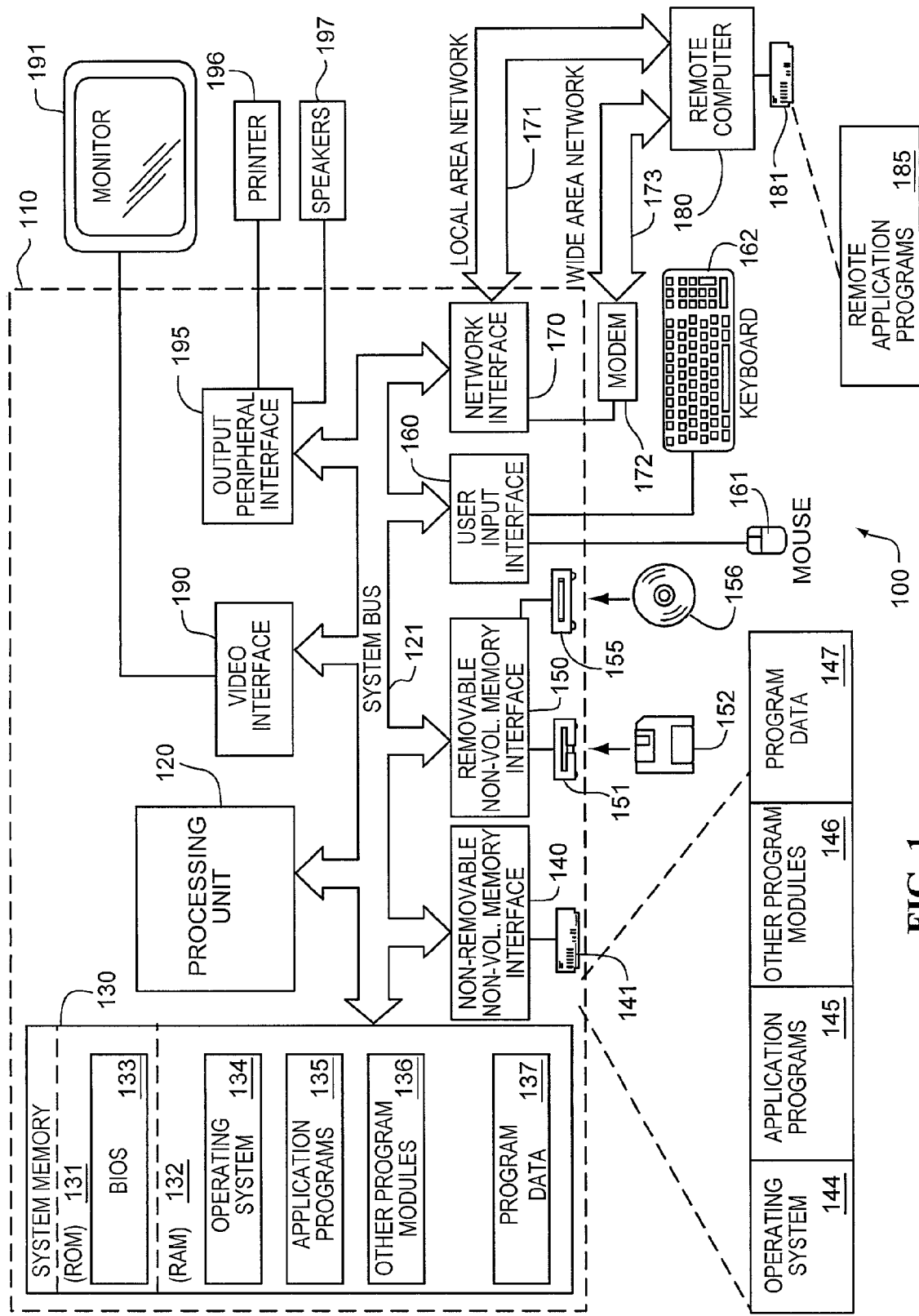
FIG. 1 is a block diagram of a computing system environment suitable for use in implementing the present invention.
Figure 2:
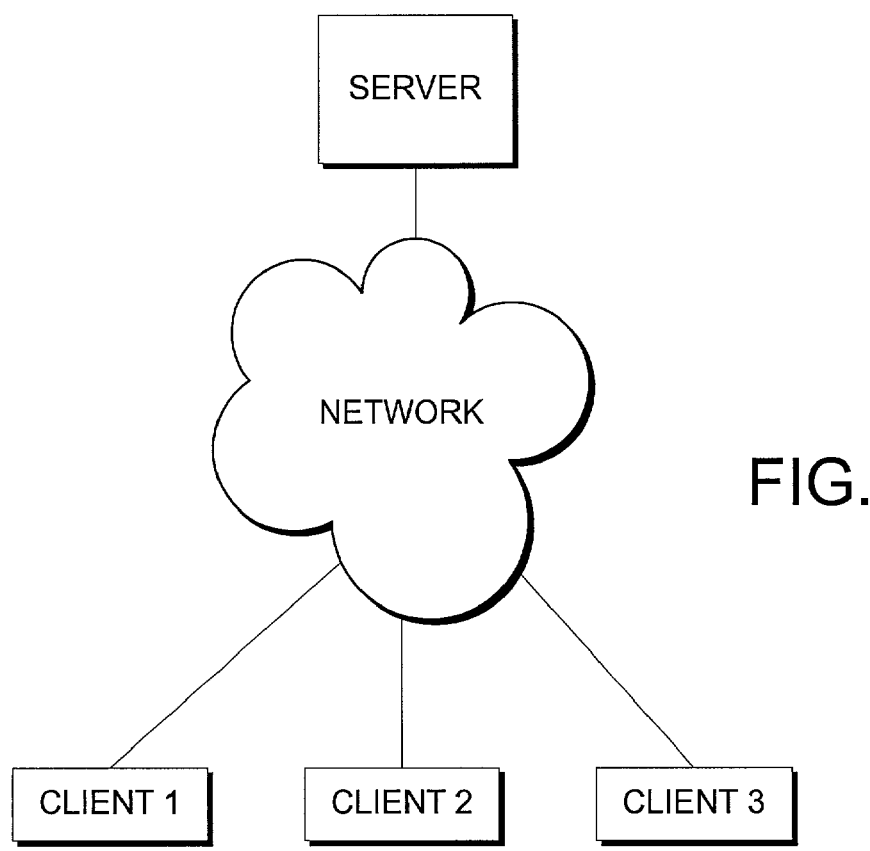
FIG. 2 is a schematic diagram illustrating a client-server environment.

The present invention provides a system and method for allowing, within a peer-to-peer session, the synchronization and recovery as peers, including the host, join and leave the session. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, cellular phones, personal digital assistants (PDAs), multiprocessor systems, microprocessor-based systems, set top boxes, programmable consumer electronics, network PCs, minicomputers, mainframe computers, and distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Those skilled in the art will understand that program modules such as the operating system 134, application programs 135 and data 137 are provided to the computer 110 via one of its memory storage devices, which may include ROM 131, RAM 132, hard disk drive 141, magnetic disk drive 151 or optical disk drive 155. Preferably, the hard disk drive 141 is used to store data 137 and programs, including the operating system 134 and application programs 135.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

Figure 3:
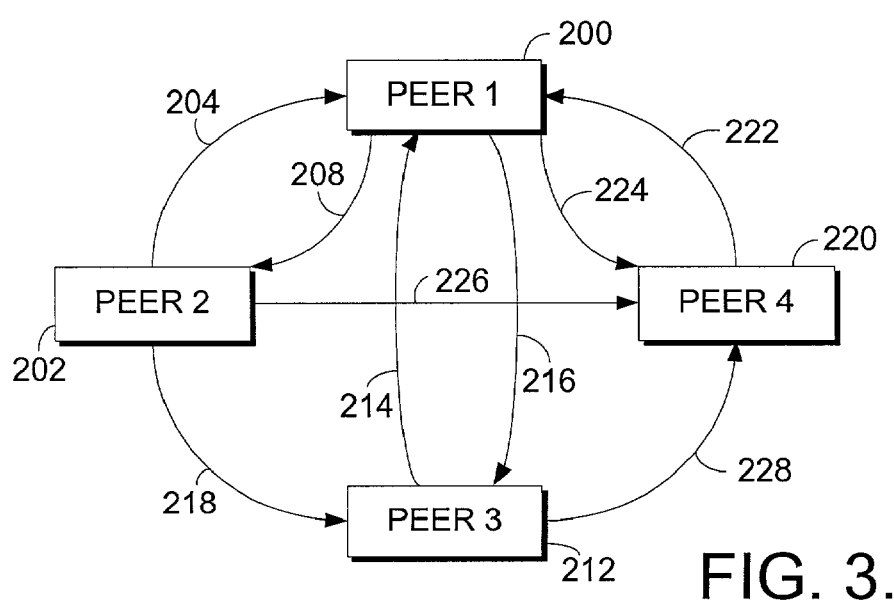
FIG. 3 is a schematic diagram illustrating a peer-to-peer environment with four peers being illustrated.

An example of a peer-to-peer session can be understood with reference to FIG. 3. As best seen in FIG. 3, a number of peers are all connected in the session, with four such peers being shown in FIG. 3. It should be understood that more or fewer peers can be connected in the session and that four peers are shown for the purposes of illustration. One particular purpose of such a peer-to-peer session is a peer-to-peer gaming session, although the invention is not limited to peer-to-peer gaming sessions. In such a gaming session environment, the peers may also be referred to as players.

Figure 4:
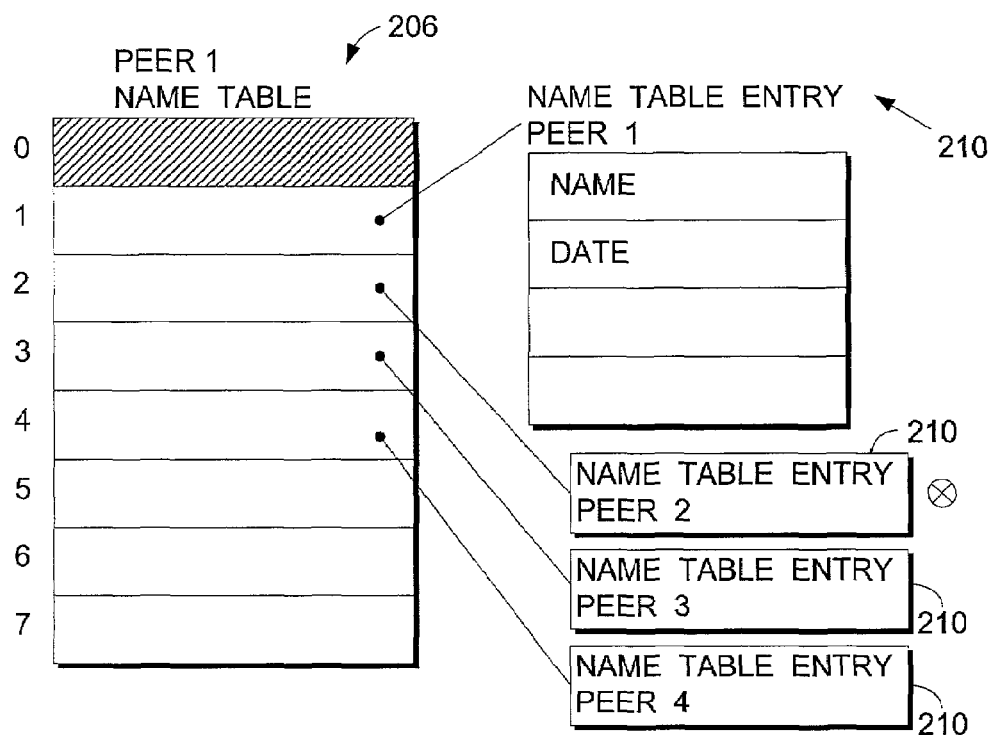
FIG. 4 is a schematic diagram illustrating name table changes assuming peers 2 and 3 are dropping from the session in a prior art environment.
Figure 4:
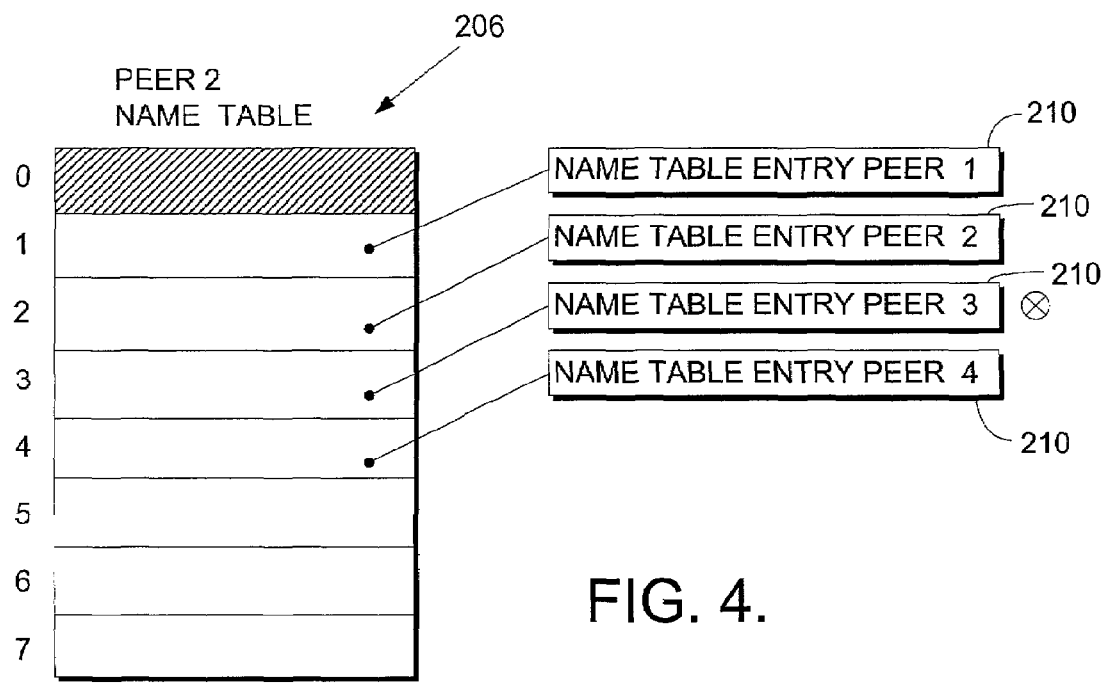

In a peer-to-peer session, the session will begin with one peer deciding to host a session. Every peer-to-peer session needs a host peer that coordinates various information throughout the session. Continuing with reference to FIG. 3, a peer, labeled PEER 1 in text and designated by the numeral 200, may decide to host a session. PEER 1 (200) is therefore the host of the session initially. Other peers may wish to join the session, and must know how to connect to PEER 1 (200), such as by knowing the network address of PEER 1. In this example, a peer labeled PEER 2 in text and designated by the numeral 202, decides to join the session hosted by PEER 1. To do so, PEER 2 forms a connection with PEER 1, as indicated by the arrow labeled 204. The connection formed may be a direct modem-to-modem connection, a connection over a network, such as the Internet, a direct serial line connection or other type of connection. Once PEER 2 forms a connection with PEER 1, PEER 1 will perform some type of authentication, to ensure, for example, that a slot is available for PEER 2 to join the session, or that PEER 2 has some clearance, such as a password, allowing PEER 2 to join the session. After the authentication, PEER 1 will send to PEER 2 a name table 206 (FIG. 4), as indicated by the arrow labeled 208 in FIG. 3.

Name table 206 contains data representing all of the peers participating in the session. At this stage, the name table sent to PEER 2 will contain data for PEERs 1 and 2. An example of name table 206 is shown schematically in FIG. 4. As illustrated, each peer participating in the session will have a name table 206. The name table 206 is the mechanism by which each peer participating in the session has information and knowledge of all other peers in the session. The initial name table 206 sent to PEER 2 by PEER 1 will contain a name table entry 210 for both PEER 1 and PEER 2. Upon receipt of the name table 206, "create player" messages will be generated by PEER 2 for PEER 1 and PEER 2. Name table entry 210 will contain information about the peer, such as the name of the peer and basic data about the peer. At this stage, the name table 206 sent to PEER 2 will not contain a name table entry 210 for PEER 3 or PEER 4, because they have yet to join the session.

Continuing with the above-example, if another player, such as PEER 3 labeled as 212, desires to join the session, that peer will form a connection with the host, PEER 1. The connection is indicated by the arrow labeled 214 in FIG. 3. PEER 1 will again perform the authentication described above, which may also be referred to as a handshake. Upon authentication, PEER 1 will send a name table 206 back to PEER 3, as indicated by the arrow labeled 216. The name table 206 sent to PEER 3 will contain peer information for all valid peers within the session. At this stage, the name table will contain name table entries 210 for PEERs 1, 2 and 3. PEER 3, at this stage, will inform the application software, such as the game software, that two peers are attached via "create player" messages. These two peers are PEER 1 and PEER 3. PEER 3 will not yet inform the application program existing on PEER 3 about PEER 2, because PEER 2 and PEER 3 are not yet connected.

Simultaneously, PEER 1 will send to PEER 2 a message informing PEER 2 that PEER 3 is joining the session, including an update for the name table 206 that includes a name table entry 210 for PEER 3. PEER 2 will then attempt to connect to PEER 3, as indicated by the arrow labeled 218 in FIG. 3. If PEER 2 cannot make a connection with PEER 3, PEER 2 will inform PEER 1, as the host, who will terminate PEER 3 from the session. PEER 3 must be terminated in this instance because it is necessary in a peer-to-peer session that each peer knows of, and can reach, each of the other peers in the session. If PEER 2 connects to PEER 3, PEER 2 will inform PEER 3 of PEER 2's identity. PEER 3 will then look in its name table 206 and will find an entry for PEER 2. At this point, PEER 3 will inform the application program that a connection has been made with PEER 2 and a "create player" message will be generated for PEER 2. In addition, a "create player" message will be generated by PEER 2 for PEER 3. Therefore, at this stage, all peers within the session know of each of the other peers.

Continuing with the above-example, if PEER 4 (220) decides to join the session, the events that take place are similar to those described above with reference to PEER 3 joining the session. More specifically, if PEER 4 desires to join the session, that peer will form a connection with the host, PEER 1. The connection is indicated by the arrow labeled 222 in FIG. 3. PEER 1 will again perform the authentication described above. Upon authentication, PEER 1 will send a name table 206 back to PEER 4, as indicated by the arrow labeled 224. Again, the name table 206 sent to PEER 4 will contain peer information for all valid peers within the session. At this stage, the name table will contain name table entries 210 for PEERs 1, 2, 3 and 4. PEER 4, at this stage, will inform the application software, such as the game software, that two peers are attached via "create player" messages. These two peers are PEER 1 and PEER 4. PEER 4 will not yet inform the application program existing on PEER 4 about PEERs 2 and 3, because PEER 4 is not yet connected with PEER 2 and PEER 3.

At this point, PEER 1 will send to PEER 2 and PEER 3 a message informing them that PEER 4 is joining the session, including an updated name table 206 that includes a name table entry 210 for PEER 4. PEER 2 and PEER 3 will then attempt to connect to PEER 4, as indicated by the arrows labeled 226 and 228, respectively, in FIG. 3. If PEER 2 and PEER 3 connect to PEER 4, they will each inform PEER 4 of their identity. PEER 4 will then look in its name table 206 and will find an entry for PEER 2 and PEER 3. At this point, PEER 4 will inform the application program that a connection has been made with PEER 2 and PEER 3 and will generate "create player" messages for them. Therefore, at this stage, all peers within the session know of each of the other peers.

The above-example illustrates a typical peer-to-peer session with four peers joining the session, with PEER 1 hosting the session. Within a session certain "name table operations" may be performed. Typically, these name table operations include: create player, destroy player, create group, destroy group, add player to group, remove player from group, update player data and update group data. The host peer is charged with overseeing these name table operations and with ensuring that each peer within a session is kept up to date with all of the name table operations. In the prior art peer-to-peer environment, as discussed above, problems with reliability and consistency arise. In part, these problems stem from the fact that in the networked environment, the messages will be delivered across the network in no particular order.

To illustrate the problems that could occur in the prior art peer-to-peer environment, it could be the case that PEERs 2 and 3 are both desiring to drop from the peer-to-peer session described above with respect to FIG. 3. Again, there is no guarantee that the order of the peers terminating from the session will be the same across the network. Therefore, PEER 1 may terminate PEER 2 first, and PEER 4 may terminate PEER 3 first. These terminations are illustrated in the name tables in FIG. 4 by an "X" within a circle. The problem existing with this scenario is that a new peer joining a session will be given the PEER 2 slot on PEER 1, and will be given the PEER 3 slot on PEER 4. This is undesirable because, in a peer-to-peer session, a peer needs to be uniquely and uniformly identified across multiple peers within the session.

The present invention addresses the above-identified problems by ensuring that all peers within the peer-to-peer environment have a consistent view of all of the other peers within the session. Each name table operation requested and performed is assigned a version number, and name table operations may only be performed sequentially, as is more fully-described below. With a version number, the order in which name table operations are received is irrelevant because the operations will be performed in order of the version number, rather than on a first-come, first-served basis.

The present invention is preferably implemented within a networking application programming interface (API) that provides networking services at the transport protocol and session protocol levels. One example of such an API is the DIRECTPLAY® API provided by the MICROSOFT® Corporation of Redmond, Wash. The API operates in connection with the game or other application that may request services of the API. The API may be structured with a core level, a protocol level and a service provider level. The core level is typically responsible for the name table operations. The protocol level is responsible for such things as authentication and the detection of which peers remain within the session. Finally, the service provider level is responsible for the physical connection to the peer-to-peer session.

Figure 5:
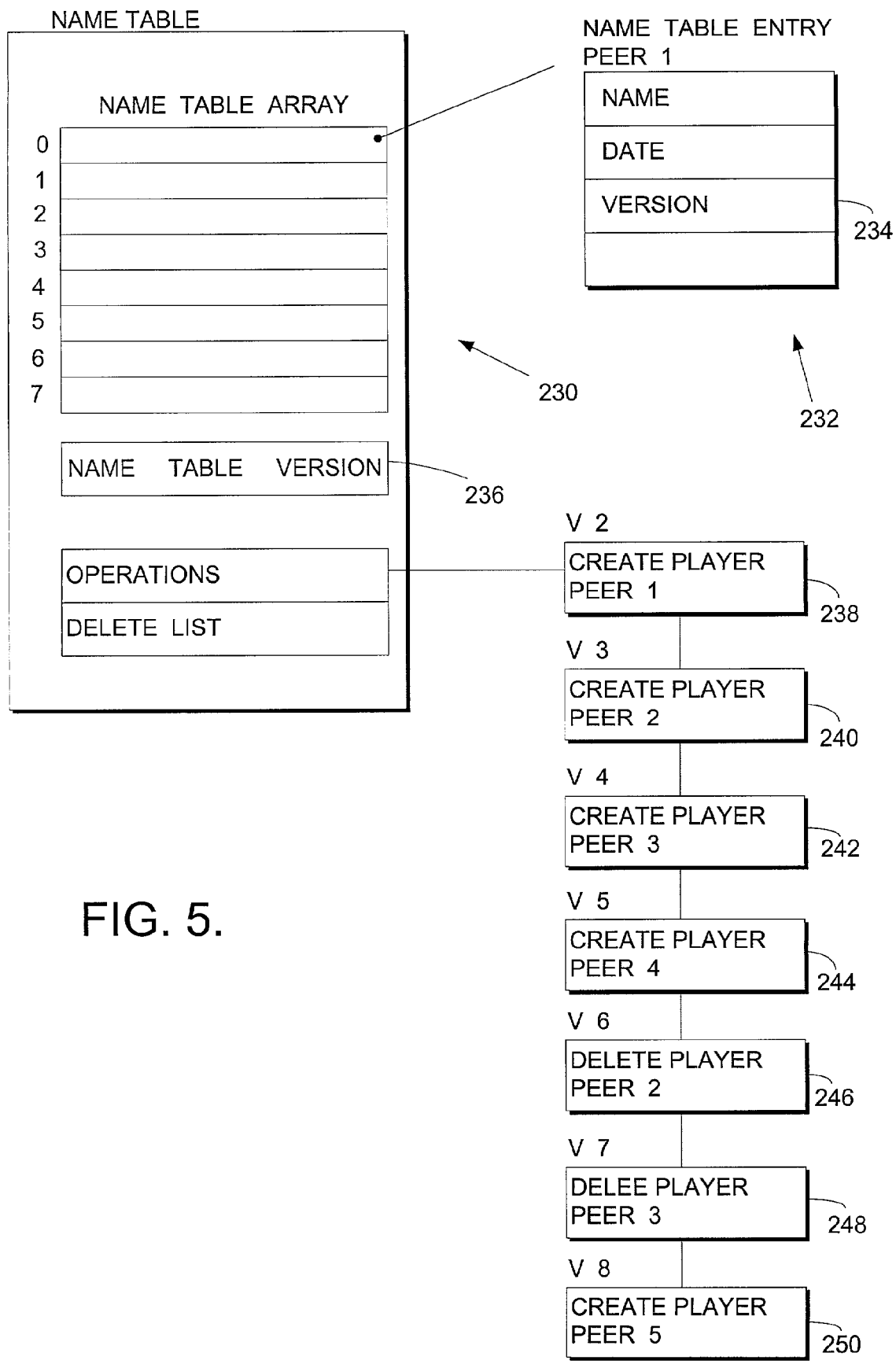
FIG. 5 is a schematic diagram illustrating a name table in the inventive peer-to-peer environment.

As best seen in FIG. 5, each peer within the peer-to-peer session will have a name table 230. Name table 230 differs from name table 206 in that each name table entry 232 for each peer will contain a version number 234 indicating the version of the name table 230 when the peer was created (the version of the name table created when the particular peer joined the session). The name table 230 also contains a name table version 236 that represents the most-recent version of the name table that the peer has processed thus far. As name table operations are requested and performed, the name table version will be incremented by one and the host peer will distribute the operations to be performed. The version of the name table informs the other peers the order in which the operations are to be executed.

An example of the operation of the name table versions can be illustrated with reference to the peer-to-peer session described above with respect to FIG. 3. In one embodiment, version 1 of the name table is reserved for the initial creation of a group. Therefore, as seen in FIG. 5, the first name table operation is version 2 of the name table 230 indicated by the numeral 238. In version 2 of the name table 230, the host PEER 1 (200) is created. Similarly, version 3 of the name table, shown as 240, creates PEER 2 (202), version 4 of the name table, shown as 242, creates PEER 3 (212) and version 5 of the name table, shown as 244, creates PEER 4 (220).

Continuing with the example above, if PEER 2 and PEER 3 drop from the session, the order in which the terminations of PEERs 2 and 3 are processed is determined and governed by the version number assigned to the particular name table operation issued by the host PEER 1. As seen in FIG. 5, the termination of PEER 2 was issued first by the host PEER 1 with name table version 6, indicated by numeral 246. Thereafter, the termination of PEER 3 was issued by the host PEER 1 with name table version 7, shown as 248. Therefore, if PEER 4 receives version 7 of the name table prior to receipt of version 6, PEER 4 will not process version 7 until version 6 is received. In this process, all peers within the session will have a consistent view of all of the other peers within the session and the name tables of all peers within the session will be the same.

If another peer, PEER 5, decided to join the session, it connects to PEER 1 as described above with respect to PEERs 2–4. PEER 1 will generate a version 8 of the name table 230, shown as 250 in FIG. 5. The name table sent by PEER 1 to PEER 5 will contain information regarding PEERs 1, 4 and 5. PEERs 2 and 3 will not be included, because at this point, PEER 1 knows that they have left the session. PEER 1 will also send an "add player" message to PEER 4 to add PEER 5 as version 8 of the name table. Again, PEER 1 will not send "add player" messages to PEERs 2 and 3 as they have left the session.

If PEER 4 receives version 8 of the name table adding PEER 5 prior to receiving versions 6 and 7 that destroy PEERs 2 and 3, then PEER 4 will not yet process version 8. Therefore, PEER 4 will not attach PEER 5 until versions 6 and 7 of the name table are processed and PEERs 2 and 3 are destroyed. It can therefore be seen that any peer that has processed the name table 230 up to version 8 will have the same name table as all other peers who have processed the name table up to version 8. If the name table operations were not assigned a version, as in the prior art, the order of name table operations is not always consistent. In the above example, with PEER 5 joining the session, if PEER 4 has not yet destroyed PEER 2 when the message to create PEER 5 message is received, then PEER 5 would not have a slot in which to exist on PEER 4.

The above-described method of assigning version numbers to the name table operations is also used in the host-migration process to ensure that the peer-to-peer session remains operational. This method, described in more detail below, provides a very stable, robust system of host migration for the peer-to-peer session.

As described above, each peer has a name table 230 that contains a version number 234 unique to that particular peer. Version number 234 is the name table version that was used to create the peer in question. Continuing with the above-example, and assuming that PEERs 1 through 4 are all currently connected to the session, version number 234 for PEER 1 is 2, version number 3 belongs to PEER 2, version number 4 belongs to PEER 3, and version number 5 belongs to PEER 4.

If the host, PEER 1, decides to leave the session, all remaining peers in the session determine whether they are the host-elect after they have been notified that the old host has dropped from the session. This notification may occur when it is discovered that communications between the host and the peer are not operational, or when the old host informs the other peers that it is dropping from the session. To determine if they are to be the new host, PEERs 2–4 will examine their name tables 230 to determine if they are the peer that has the lowest version number 234. The peer that has the lowest version number 234 is the host-elect, and will take over as the host of the session. In the above-example, PEER 2 has version number 3, which is lower that the version numbers of PEERs 3 and 4. Therefore, PEER 2 will be the new host. After the host-elect has been determined, the host-migration process continues as shown in FIG. 6.

Figure 6A:
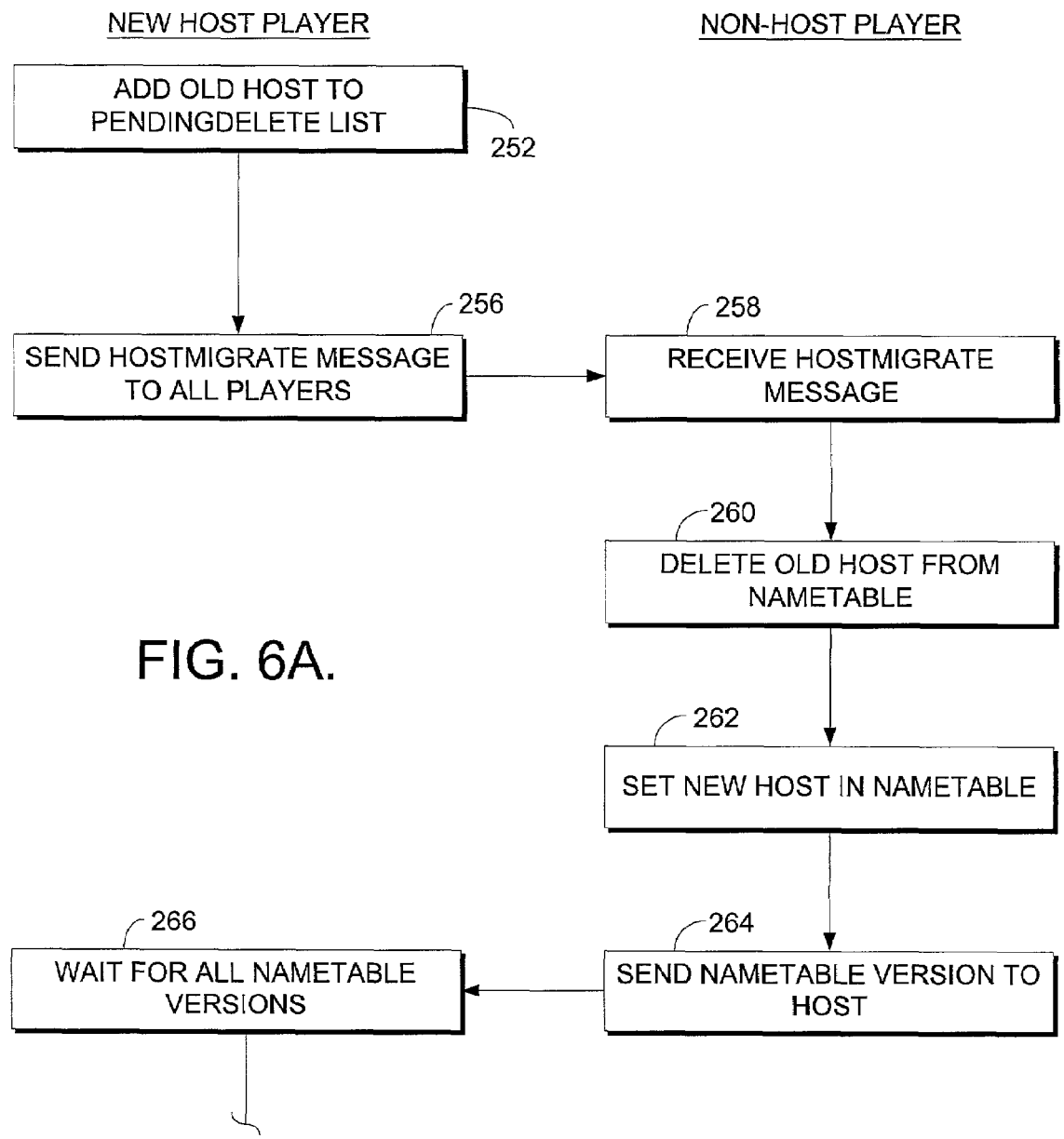
FIG. 6a is a flow chart illustrating the sequence of events of host migration using the inventive method and system.
Figure 6B:
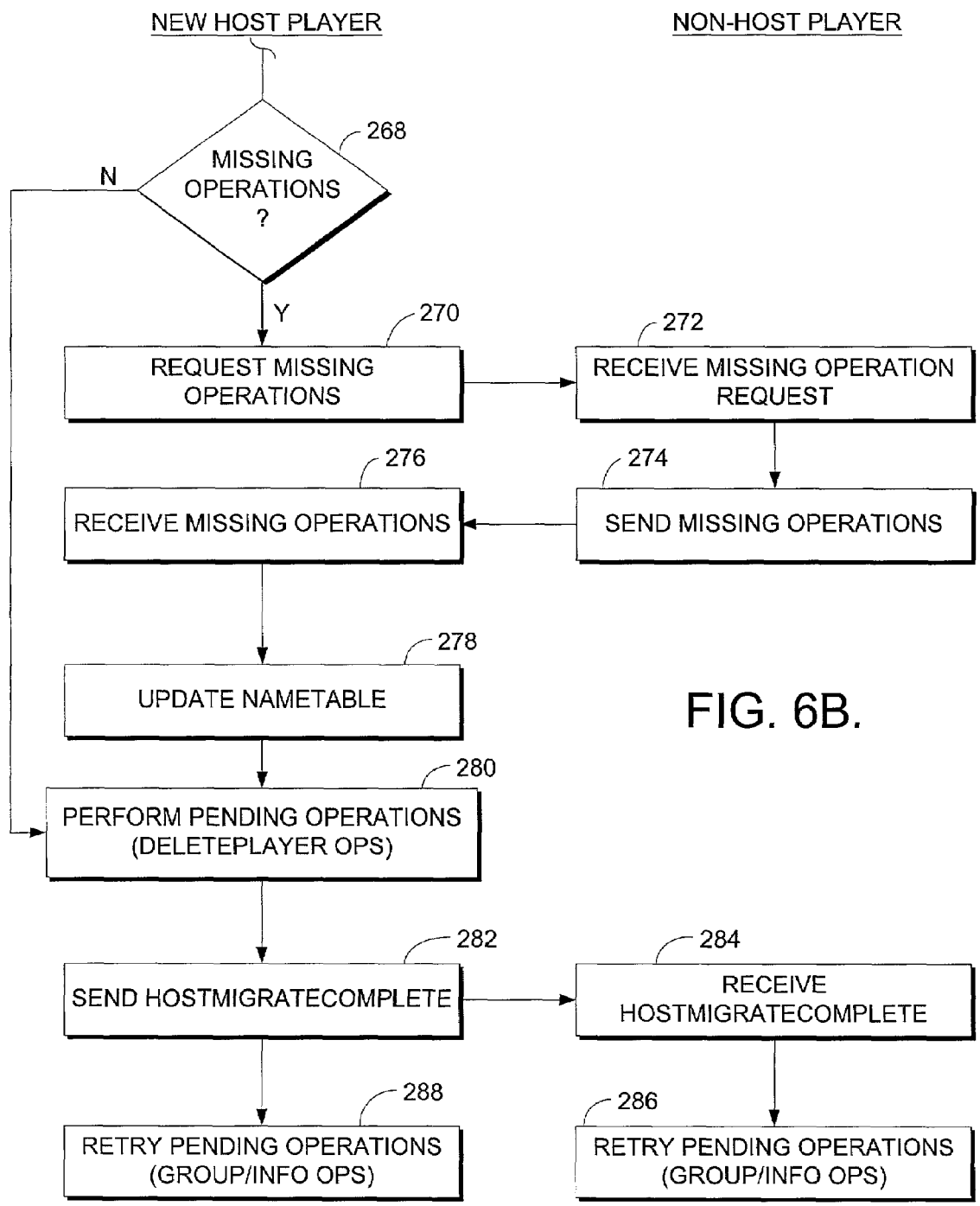

With reference to FIG. 6, the newly determined host-elect will first add the old host to its pending delete list, as shown in box 252. The pending delete peer list is queued because it is undesirable to submit delete player operations until the most recent version of the name table is processed, and at this point, the most recent version may be unknown to PEER 2. In the above-example, PEER 2 will add PEER 1 to the pending delete list. Additionally, as shown in box 256, PEER 2 will send to all of the other peers a message indicating that it is the new host, and that the host migration process has started. The message includes a request of the peers for the most recent version of the name table that they possess.

At this stage, the new host may not be aware of all of the players or peers in the session. This may be the result of a player being in the midst of joining the session when the old host dropped. Furthermore, the old host may have been in the process of performing an operation, and updating other peer's name tables. If these updates have not been fully propagated to the new host, the new host will not have the most recent version of the name table, even though other peers within the session do. The host-elect must discover the most recent version of the name table to properly update the session. Therefore, when the non-host peers receive the host migrate message, as shown in box 258, they delete the old host from their name table 230, as shown in box 260. Each peer then sets the new host in their name table 230, as shown in box 262 and sends back to the host elect the most recent version of the name table that the particular peer has processed, as shown in box 264. The new host waits for all of the peers to submit their name table versions, as shown in box 266.

As shown in the diamond 268, the new host determines whether any name table operations are missing from its current name table, such as will be the case if one or more peers has a more recent version of the name table than that possessed by the new host. If operations are missing, the new host requests the missing operations, as shown in box 270. The peer in question receives this missing operation request and sends back to the new host any missing operations, as shown in boxes 272 and 274, respectively.

The new host receives the missing operations, as shown in box 276, and updates its name table accordingly, as shown in box 278. After updating the name table, the new host executes any pending operations, such as the queued delete player operations, as shown in box 280. The new host then sends to all of the remaining peers a message indicating that the host migration process is complete, as shown in box 282. Included in this message is the up-to-date version of the name table. Because the new host already has each of the other peer's name table version via the sending and receiving steps 264 and 266, the new host knows the name table operations that each of the peers is missing. The non-host peers receive the host migration complete message and updated version of the name table, as shown in box 284. At this point, any pending name table operations involving groups or player data, which have not yet been performed, are retried, as shown in boxes 286 and 288. Using the above-described method, the host migration process takes place while ensuring that the integrity of the session is upheld, reducing the occurrence of a fragmented session, or a lost session. Moreover, the method and system described ensure that the new host, and all other peers, will have the most up-to-date version of the name table, so that name table operations are not lost in the host migration process.

To more fully illustrate certain events in the host migration process, suppose that PEER 1 is the host as described above, and that PEERs 2-4 are already connected and participating in the session. It may be the case that a new peer, PEER 5, may be in the process of joining the session as PEER 1 is dropping. In this example, it may also be the case that PEER 5 has attached and connected to PEER 1, and that PEER 1 has sent a message to create PEER 5, along with an updated, incremented version of the name table. Due to the fact that networked messages cannot be depended upon to be deliverable in the order in which they were sent, it may be the case that the message to create PEER 5 has been received by PEER 3, but not by PEERs 2, 4 and 5 prior to PEER 1 dropping.

If the above example occurs, the host migration process described above will ensure that PEER 5 remains within the session. In the example, PEER 2 will take over as the new host, as described above, and will inform the other peers of his host status, as shown in box 256 of FIG. 6. PEER 2 will not send a message to PEER 5, because it did not receive the create player message prior to taking over as the new host. When PEERs 3 and 4 receive the host migration message, they will determine the latest version of the name table that they have processed, and will send that version number back to PEER 2, as shown in box 264. Continuing with the above example, PEER 3 has a later version of the name table than either PEER 2 or PEER 4.

After PEER 2 has received all of the name table versions from the peers, PEER 2 determines that it is missing operations as shown in box 268, because it does not have the latest version of the name table. As shown in boxes 270–276, PEER 2 requests the missing operations from PEER 3 and PEER 3 sends the missing create player PEER 5 operation back to PEER 2. PEER 2 then updates the name table it has and sends the updated name table to all of the peers, so that PEER 5 joins the session, and all of the other peers know of PEER 5's existence.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

We claim:

1. A method for use in a computer system, operating in a peer-to-peer environment having a host peer and at least one non-host peer, and for ordering operation requests of the at least one non-host peer, the operation requests being one of a provided list of recognized operations which may be requested, comprising:

transmitting a first name table to the at least one non-host peer when the at least one non-host peer joins a session, the name table including a name table entry for each peer within the session, wherein each name table entry contains a version number corresponding to when each peer joined the session;

receiving, by the host peer, a first operation request from the provided list of recognized operations;

assigning, by the host peer, a first unique version number to the first operation request and a second name table;

transmitting the second name table including a first operation order to the at least one non-host peer in the session;

subsequently receiving, by the host peer, a second operation request from the provided list of recognized operations;

assigning, by the host peer, a second unique version number to the second operation request and a third name table, the second unique version number indicating a later receipt time than the first unique version number, such that the host peer evaluates relative arrival times of the first operation request and the second operation request based on the first unique version number and the second unique version number; and transmitting the third name table including a second operation order to the at least one non-host peer in the session.

2. The method of claim 1, further comprising processing, by the host peer, the first and second operation requests in the order of the first unique version number and the second unique version number.

3. A computer readable medium having at least one physical media containing computer executable instructions for performing a method for use in a computer system, operating in a peer-to-peer environment having a host peer and at least one non-host peer, and for ordering operation requests of the at least one non-host peer, the operation requests being one of a provided list of recognized operations which may be requested, the method comprising:

transmitting a first name table to the at least one non-host peer when the at least one non-host peer joins a session, the name table including a name table entry for each peer within the session, wherein each name table entry contains a version number corresponding to when each peer joined the session;

receiving, by the host peer, a first operation request from the provided list of recognized operations;

assigning, by the host peer, a first unique version number to the first operation request and a second name table;

transmitting the second name table including a first operation order to the at least one non-host peer in the session;

subsequently receiving, by the host peer, a second operation request from the provided list of recognized operations;

assigning, by the host peer, a second unique version number to the second operation request and a third name table, the second unique version number indicating a later receipt time than the first unique version number, such that the host peer evaluates relative arrival times of the first operation request and the second operation request based on the first unique version number and the second unique version number; and transmitting the third name table including a second operation order to the at least one non-host peer in the session.

4. A method for use in a computer system, operating in a peer-to-peer environment having a host peer and at least one non-host peer, and for requesting operations of the host peer, the operations being one of a provided list of recognized operations which may be requested, comprising:

receiving, by the at least one non-host peer, a first name table including a name table entry for each peer within a session, wherein each name table entry contains a version number corresponding to when each peer joined the session;

sending, by the at least one non-host peer, at least one operation request from the provided list of recognized operations to the host peer;

receiving, by the at least one non-host peer, a second name table including an operation order, the second name table being assigned a first assigned unique version number associated with the operation request;

determining whether the first assigned unique version number received is next in a sequence of version numbers processed by the at least one non-host peer, and if it is not, queuing the operation order until the first assigned unique version number is next in the sequence of version numbers processed by the at least one non-host peer; and processing, by the at least one non-host peer, the operation order in the order that the first assigned unique version number is in within the sequence of version numbers.

5. A computer readable medium having at least one physical media containing computer executable instructions for performing a method for use in a computer system, operating in a peer-to-peer environment having a host peer and at least one non-host peer, and for requesting operations of the host peer, the operations being one of a provided list of recognized operations which may be requested, the method comprising:

receiving, by the at least one non-host peer, a first name table including a name table entry for each peer within a session, wherein each name table entry contains a version number corresponding to when each peer joined the session;

sending, by the at least one non-host peer, at least one operation request from the provided list of recognized operations to the host peer;

receiving, by the at least one non-host peer, a second name table including an operation order, the second name table being assigned a first assigned unique version number associated with the operation request;

determining whether the first assigned unique version number received is next in a sequence of version numbers processed by the at least one non-host peer, and if it is not, queuing the operation order until the first assigned unique version number is next in the sequence of version numbers processed by the at least one non-host peer; and processing, by the at least one non-host peer, the operation order in the order that the first assigned unique version number is in within the sequence of version numbers.

6. The method of claim 1, wherein the version number is used to determine a subsequent host peer.

7. The computer readable medium of claim 3, wherein the version number is used to determine a subsequent host peer.

8. The method of claim 4, wherein the version number is used to determine a subsequent host peer.

9. The computer readable medium of claim 5, wherein the version number is used to determine a subsequent host peer.

10. The computer readable medium of claim 3, further comprising processing, by the host peer, the first and second operation requests in the order of the first unique version number and the second unique version number.

11. The method of claim 6, further comprising receiving, by the subsequent host, a fourth name table from the at least one non-host peer to identify any missing operation orders, the fourth name table corresponding to the highest version numbered name table processed by the at least one non-host peer.

12. The method of claim 11, further comprising transmitting an updated name table to the at least one non-host peer after the fourth name table is processed by the subsequent host.

13. The computer readable medium of claim 7, further comprising receiving, by the subsequent host, a fourth name table from the at least one non-host peer to identify any missing operation orders, the fourth name table corresponding to the highest version numbered name table processed by the at least one non-host peer.

14. The computer readable medium of claim 13, further comprising transmitting an updated name table to the at least one non-host peer after the fourth name tables is processed by the subsequent host.

15. The method of claim 8, further comprising receiving, by the subsequent host, a fourth name table from the at least one non-host peer to identify any missing operation orders, the fourth name table corresponding to the highest version numbered name table processed by the at least one non-host peer.

16. The method of claim 15, further comprising transmitting an updated name table to the at least one non-host peer after the fourth name table is processed by the subsequent host.

17. The computer readable medium of claim 9, further comprising receiving, by the subsequent host, a fourth name table from the at least one non-host peer to identify any missing operation orders, the fourth name table corresponding to the highest version numbered name table processed by the at least one non-host peer.

18. The computer readable medium of claim 17, further comprising transmitting an updated name table to the at least one non-host peer after the fourth name table is processed by the subsequent host.

* * * * *